United States Patent [19]
Hung

[11] Patent Number: 5,636,854
[45] Date of Patent: Jun. 10, 1997

[54] CYCLE PROPELLED BY PEDAL AND SADDLE MOVEMENT

[76] Inventor: George Hon-Cheung Hung, Merry Terrace, 4 Seymour Road, Block K, 1st, Hong Kong, Hong Kong

[21] Appl. No.: 397,269
[22] PCT Filed: Sep. 21, 1993
[86] PCT No.: PCT/GB93/01984
 § 371 Date: Mar. 15, 1995
 § 102(e) Date: Mar. 15, 1995
[87] PCT Pub. No.: WO94/06673
 PCT Pub. Date: Mar. 31, 1994

[30] Foreign Application Priority Data

Sep. 21, 1992 [GB] United Kingdom ............. 9219948

[51] Int. Cl.⁶ ........................................... B62M 1/20
[52] U.S. Cl. ................. 280/226.1; 280/230; 280/259
[58] Field of Search ........................ 280/226.1, 220, 280/221, 223, 227, 230, 259

[56] References Cited

U.S. PATENT DOCUMENTS

| 633,943 | 9/1899 | Austin | 280/226.1 |
| 3,133,747 | 5/1964 | Nelson | 280/226.1 |
| 4,371,185 | 2/1983 | Bals | 280/226.1 X |

FOREIGN PATENT DOCUMENTS

| 0054362 | 2/1938 | Denmark | 280/226.1 |
| 0392051 | 11/1908 | France | 280/226.1 |
| 0454494 | 7/1913 | France | 280/226.1 |
| 3137317 | 4/1983 | Germany . | |
| 0404539 | 1/1946 | Italy | 280/226.1 |
| 0206076 | 10/1939 | Switzerland . | |
| 0126539 | 5/1919 | United Kingdom | 280/226.1 |
| 2111924 | 7/1983 | United Kingdom . | |

*Primary Examiner*—Anne Marie Boehler
*Attorney, Agent, or Firm*—Burns, Doane, Swecker & Mathis

[57] ABSTRACT

A cycle is convertible between a standard cycle configuration for normal cycling and an exercise configuration in which the cycle is propelled forwards by alternate saddle strokes, and pedal strokes, the saddle stroke comprising putting the cyclist's weight on the saddle which moves downwardly driving the crank shaft and bringing the two in-phase pedals upwardly, the pedal stroke comprising pressing down on both pedals to bring the saddle up again. In the exercise configuration the cycle is prevented form stalling by an arrangement whereby when the pedals are at bottom dead center the weight on the saddle is applied to the crank at an angle to the vertical to maintain forward propulsion, and whereby when the saddle is at bottom dead center the pedals are just forward of top dead center so as to maintain forward propulsion. In the exercise configuration the pedals may be constrained to rotate in one direction only by means of a ratchet mechanism thereby preventing the pedals hitting the cyclist on the shins.

5 Claims, 4 Drawing Sheets

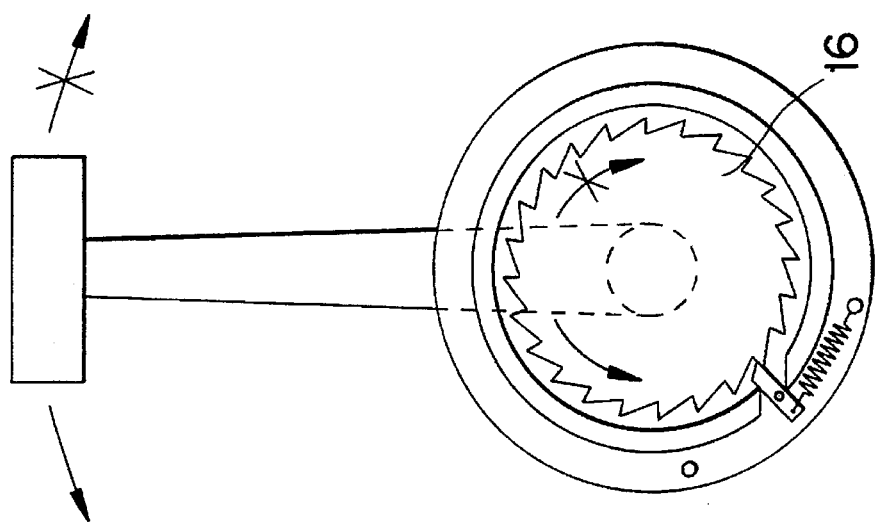
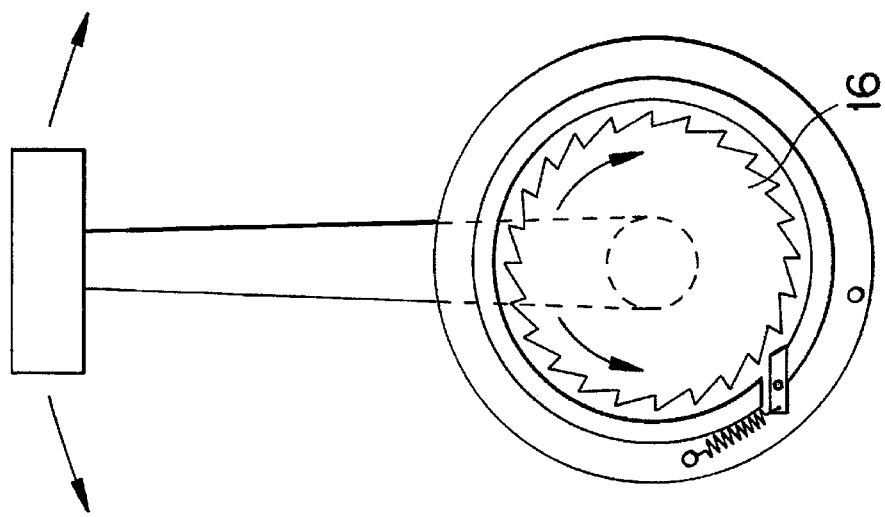
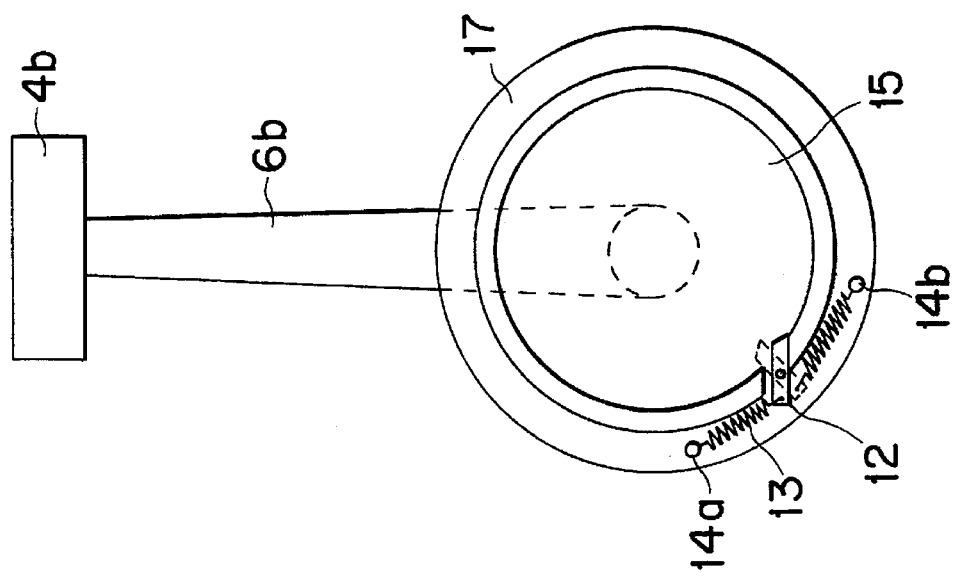

CYCLE PROPELLED BY PEDAL AND SADDLE MOVEMENT

This invention relates to cycles, and in particular, to cycles in which rotation of the drive wheel can be effected by the application of force alternately to pedals and to the saddle.

My earlier United Kingdom patent specification No. 2 111 924 describes a bicycle of the type mentioned above. The bicycle is in the nature of an exercise bicycle intended to allow the cyclist to exercise muscles and joints different to those which are exercised using a conventional bicycle, while at the same time experiencing the pleasures of outdoor cycling.

My earlier bicycle is not suitable for use in exercising those muscles and joints which are exercised by using a conventional bicycle and for this reason a person interested in exercising both sets of muscles and joints would be obliged to purchase, store and maintain two different types of bicycle.

My earlier bicycle suffers from stalling at low speed, for example when going up hill. The cyclist pushes downwardly on the pedals so that they rotate from the top dead centre position to the bottom dead centre position, bringing the saddle upwards towards the uppermost position. The momentum of the pedals should then cause the pedals to move past the bottom dead centre position. Often however the momentum does not do so, for example because the cyclist continues to push downwardly on the pedals for an instant too long, or because the cyclist while sitting on the saddle and putting almost his entire weight on the saddle, nevertheless leaves the weight of his feet on the pedals. Once the pedals lose their momentum the directly vertically downward weight of the cyclist on the saddle is insufficient to bring the pedals past the bottom dead centre position.

My earlier cycle also suffers from the disadvantage that if a cyclist mounts a bicycle with the saddle near but to the rear of the top dead centre position and the pedals near but just forward of the bottom dead centre position the result may be that the weight of the cyclist drives the saddle downwardly, causing the pedals to counter rotate upwardly hitting the rider unexpectedly on the shins.

In one aspect the invention provides a cycle which is convertible between an exercise configuration in which the saddle and pedals are connected to the crank shaft out of phase with one another so that the cycle may be propelled forwardly by the application of force to the pedals and the saddle in the manner of my earlier cycle, and a conventional configuration in which the saddle is connected to the cycle frame and the two pedals are connected to the crank shaft out of phase with one another so that the cycle may be cycled in the conventional manner. A cyclist may use the cycle in the exercise configuration to take exercise, in the conventional configuration for transport purposes, or may set off on e.g. a day trip and convert from one mode to another as and when required.

Thus there is provided a bicycle which is useful for both forms of exercise and which does not suffer from the disadvantages described above and other disadvantages of the prior art.

In another aspect the invention provides a cycle in which rotation of the drive wheel can be effected by the application of force alternately to pedals and to the saddle, in which the saddle and the pedals are connected to the crank shaft in a configuration such that when the pedal cranks and pedals are at the bottom dead centre position, the transmission between the saddle and the saddle crank is at an angle to the saddle crank such that the weight of the cyclist is applied to the saddle crank with mechanical advantage to propel the cycle in a forward direction. The likelihood of stalling when the pedals are in the bottom dead centre position is reduced.

In a further aspect the invention provides a cycle in which rotation of the drive wheel can be effected by the application of force alternately to pedals and to the saddle, in which the saddle and pedals are connected to the crankshaft in a configuration such that when the saddle is at the bottom most position the pedal cranks and pedals are just forward of the top dead centre position. The likelihood of stalling with the saddle in the bottom most position is reduced.

In a still further aspect the invention provides a cycle in which rotation of the drive wheel can be effected by the application of force alternately to the pedals and to the saddle, in which the crank mechanism includes a mechanism for limiting rotation to the forward direction only so that when a cyclist mounts the cycle and sits on the saddle near top dead centre, the cyclist is not hit on the shins by the pedals as they move up in response to the saddle moving down.

Preferably this mechanism can be alternatively engaged or disengaged at the option of the cyclist, so that a cyclist who is very experienced at riding the cycle may disengage the mechanism allowing both rotation and counter rotation of the pedals, and may propel the cycle forwardly by pumping up and down on the saddle and on the pedals always on the same side of top and bottom dead centre without ever bringing the saddle and pedals through top or bottom dead centre, while a cyclist who is less experienced and risks being hit in the shins may leave the mechanism engaged as to allow rotation in the forward direction.

There now follows a description of a preferred embodiment of the invention, by way of example, with reference being made to the accompanying drawings in which:

FIGS. 4a, 4b and 4c show a left hand side view of a detail of the cycle illustrating one example of a mechanism for allowing or preventing counter rotation of the pedals.

Figure 1:
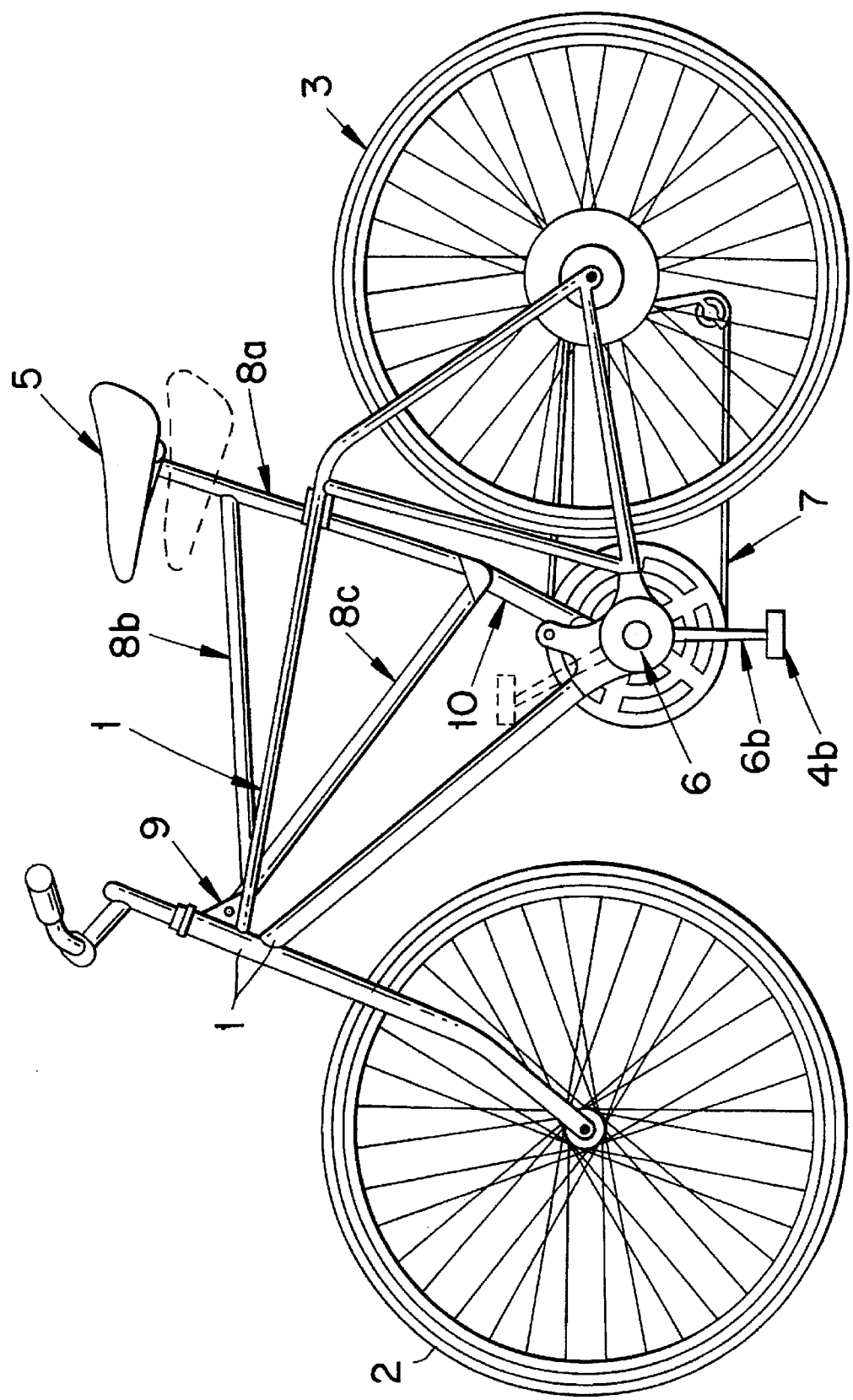
FIG. 1 is a left hand side view of a cycle according to the invention in the exercise configuration.

The cycle comprises a rigid cycle frame 1, a front wheel 2, a rear drive wheel 3, right hand side pedal 4a and left hand side pedal 4b, a saddle 5, a crank shaft 6 and a drive transmission chain 7 which is on the right hand side of the bicycle.

In the exercise configuration shown in FIG. 1, the saddle support column 8a which forms part of a rigid triangular sub-frame 8a, 8b, 8c pivoted at a pivot mounting 9 on the cycle frame 1 is connected to a link 10 which in turn is connected to the crank shaft 6 via saddle crank 6c. The pedals 4a, 4b are mounted on cranks 6a, 6b configured in phase with one another (pedal 4a and crank 6a cannot be seen in FIG. 1, as they are immediately behind pedal 4b and crank 6b and out of phase with the saddle 5. As a result, the cycle may be propelled forward by a pedal stroke comprising applying downward foot pressure on pedals 4a, 4b causing rotation of the crank shaft 6, chain 7 and drive wheel 3 and also causing the saddle support column 8a and the saddle 5 to rise upwardly, followed by a saddle stroke comprising releasing the foot pressure so that the saddle 5 and saddle support column 8a descend under the weight of the cyclist, causing rotation of the crank shaft 6, drive transmission chain 7 and rear wheel 3, and also causing the pedals 4a, 4b to rise again. Propelling the cycle in this way including the rising and falling motion of the cyclist's body is quite strenuous and exercises many different muscles.

Figure 2:
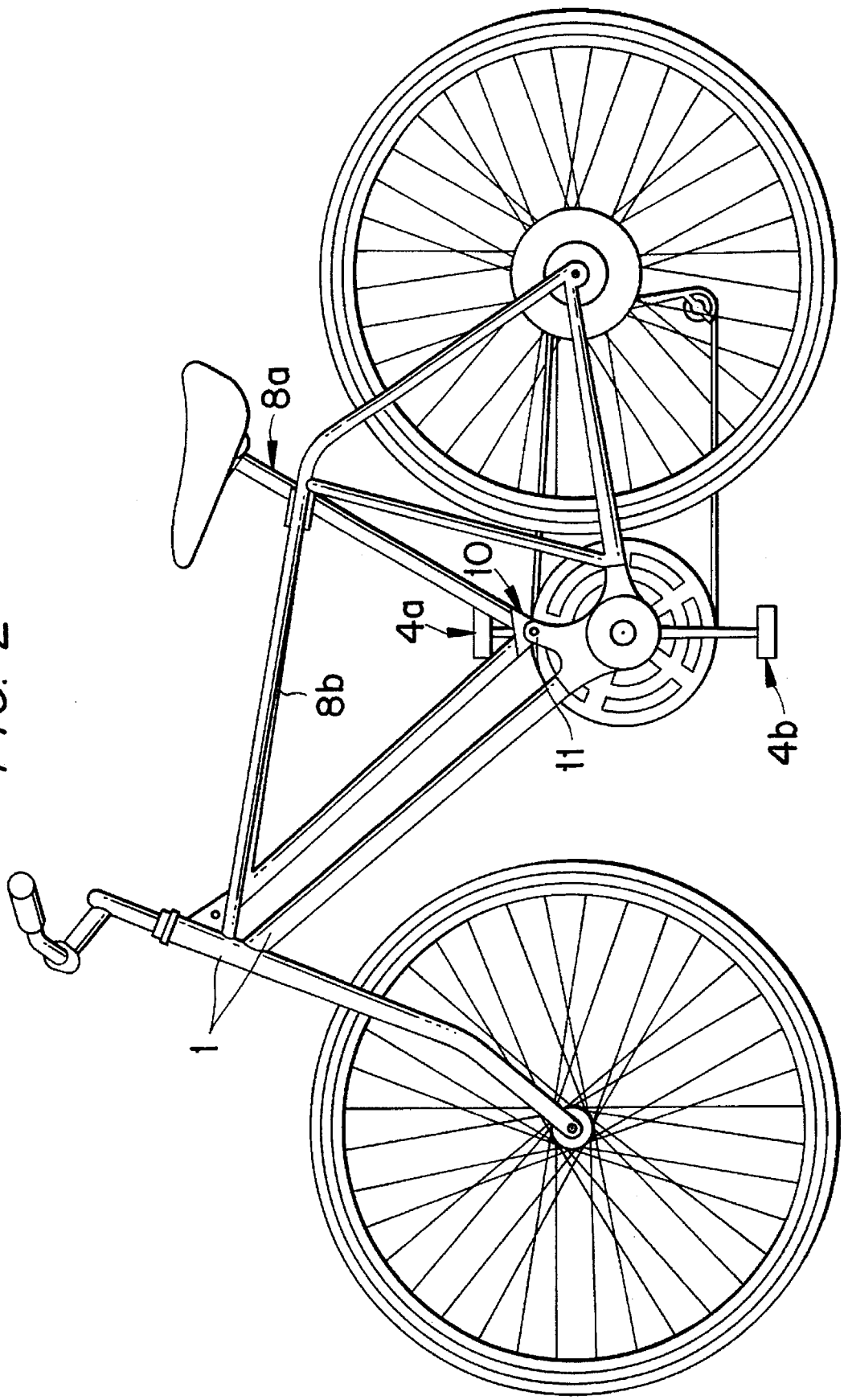
FIG. 2 is a similar view but showing the cycle in the conventional configuration.

In the conventional configuration shown in FIG. 2, left hand pedal 4b has been reset so that it is out of phase with pedal 4a. The link 10 has been disconnected from the saddle support column 8a and has been removed from the bicycle. The saddle support column 8a has then been connected directly to the fixed mounting point 11. To assist in resetting the pedal 4b and in connecting and disconnecting the link 10, these components are mounted to the cycle by attachment means which can readily be secured or released using a spanner or other simple hand tool. The cycle is propelled forwardly in the conventional manner.

Using the cycle according to the invention the cyclist may go on short or long trips as desired, and whenever using the cycle in the exercise configuration becomes too tiring, the cyclist can quickly convert the cycle to the conventional configuration and carry on cycling in a more leisurely manner.

Figure 3:
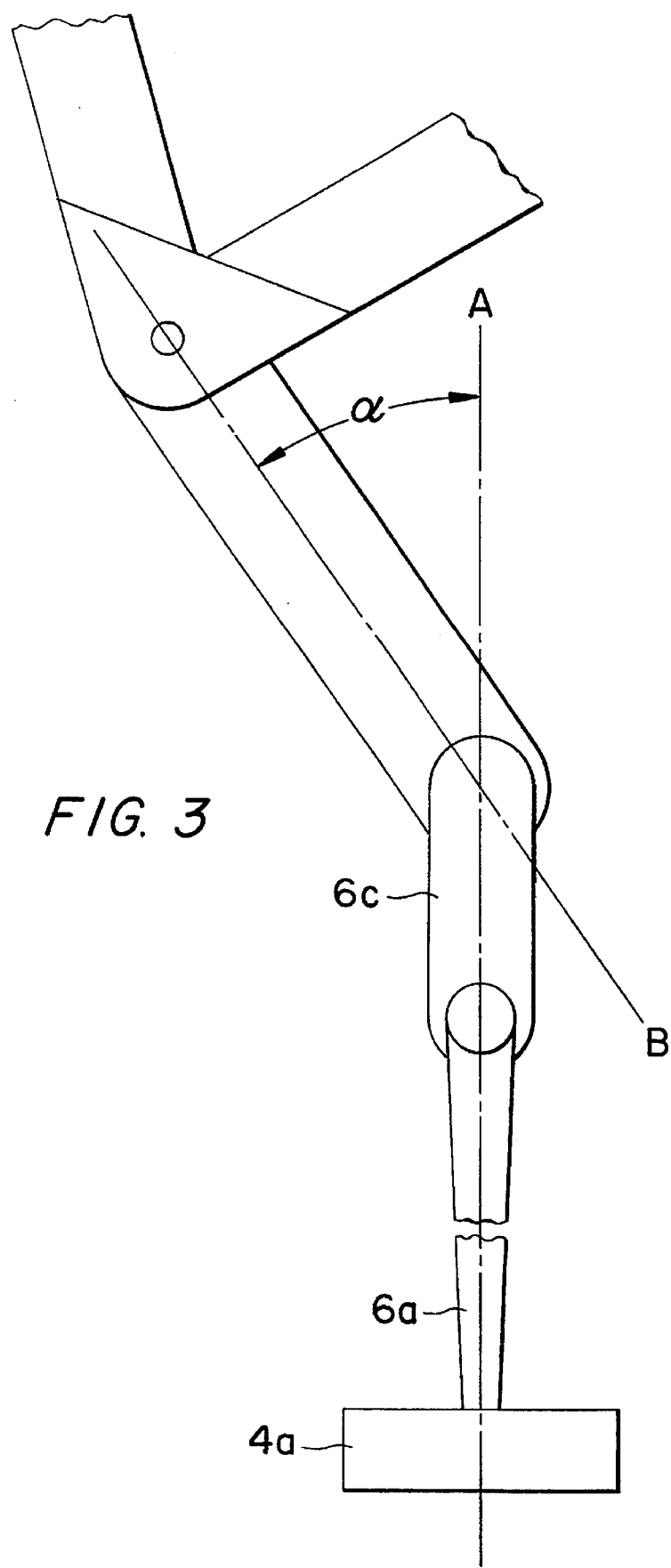
FIG. 3 is a right hand side view of a detail of the cycle on a larger scale showing the transmission from the saddle to the saddle crank.

Referring to FIG. 3, the pedal crank 6a and pedal 4a are shown in the bottom dead centre position. The saddle crank 6c lies along an axis A while link 10 lies along an axis B, and as a result of the angle $\alpha$ between axis A and axis B, the weight on the saddle 5 is transmitted with mechanical advantage, ensuring that the saddle 5 moves downwardly, and the pedals 4a, 4b continue to rotate.

Referring now to FIG. 1, the dashed lines show the saddle 5 in the bottom mosts position and show the position of the pedals 4a, 4b. It will be seen that the pedals 4a, 4b are just forward of the top dead centre position (in the drawing the distance forward has been exaggerated for purposes of illustration). This arrangement allows the cyclist to apply pressure to the pedals so as to create a definite forward propulsion and reduce the risk of stalling.

Referring to FIG. 4a, the pedal crank 6b and pedal 4b are shown in the top dead centre position. A ratchet lever 12 is pivotally moveable between a disengaged position as shown in the full lines and an engaged position as shown in the dashed lines. The lever 12 is retained in the appropriate position by means of a coil compression spring 13 with a loop at one end which the cyclist may place over one or other of the two anchor posts 14a, 14b provided for that purpose. FIGS. 4b and 4c show the cover 15 of the crank mechanism removed, to reveal the ratchet 16 and the engagement and disengagement of the ratchet lever 12 with the ratchet. The ratchet mechanism 12, 13, 14, 16 is contained in a housing 17 located at the left hand end of the crank shaft 6.

Instead of a ratchet mechanism any other desired mechanism may be used to releasably constrain pedal rotation to one direction only, for example a clutch mechanism may be used. In an alternative construction (not illustrated), the mechanism need not be releasable, instead pedal rotation is permanently constrained to one direction.

The construction described above is given by way of example only and many other constructions are possible.

I claim:

1. A cycle comprising:
pedals;
pedal cranks connected to the pedals;
a saddle;
a saddle crank connected to the saddle;
a crankshaft connected to the pedal cranks and to the saddle crank; and a drive wheel;
wherein rotation of the drive wheel can be effected by the application of force alternately to the pedals and to the saddle;
and wherein the saddle and the pedals are connected to the crankshaft in a configuration such that when the pedal cranks and the pedals are at a bottom dead center position, a transmission between the saddle and the saddle crank is at an angle to the saddle crank such that the weight of the cyclist is applied to the saddle crank to impart a torque to propel the cycle in a forward direction;
and wherein the saddle and pedals are connected to the crankshaft in a configuration such that when the saddle is at a bottom most position the pedal cranks are just forward of the top dead center position.

2. A cycle as claimed in claim 1 further comprising a mechanism for limiting rotation to the forward direction only.

3. A cycle comprising:
pedals;
pedal cranks connected to the pedals;
a saddle;
a saddle crank connected to the saddle;
a crankshaft connected to the pedal cranks and to the saddle crank;
a limiting mechanism for limiting rotation to the forward direction only, the limiting mechanism being releasable; and
a drive wheel;
wherein rotation of the drive wheel can be effected by the application of force alternately to the pedals and to the saddle;
and wherein the saddle and the pedals are connected to the crankshaft in a configuration such that when the pedal cranks and the pedals are at a bottom dead center position, a transmission between the saddle and the saddle crank is at an angle to the saddle crank such that the weight of the cyclist is applied to the saddle crank to impart a torque to propel the cycle in a forward direction.

4. A cycle comprising:
pedals;
pedal cranks connected to the pedals;
a saddle;
a saddle crank connected to the saddle;
a crankshaft connected to the pedal cranks and to the saddle crank;
a limiting mechanism for limiting rotation to the forward direction only, said limiting mechanism being releasable and said limiting mechanism comprising a ratchet mechanism; and
a drive wheel;
wherein rotation of the drive wheel can be effected by the application of force alternately to the pedals and to the saddle;
and wherein the saddle and the pedals are connected to the crankshaft in a configuration such that when the pedal cranks and the pedals are at a bottom dead center position, a transmission between the saddle and the saddle crank is at an angle to the saddle crank such that the weight of the cyclist is applied to the saddle crank to impart a torque to propel the cycle in a forward direction.

5. A cycle comprising:

pedals;

pedal cranks connected to the pedals;

a saddle;

a saddle crank connected to the saddle;

a crankshaft connected to the pedal cranks and to the saddle crank;

a limiting mechanism for limiting rotation to the forward direction only, said limiting mechanism being releasable and said limiting mechanism comprising a clutch mechanism; and a drive wheel;

wherein rotation of the drive wheel can be effected by the application of force alternately to the pedals and to the saddle;

and wherein the saddle and the pedals are connected to the crankshaft in a configuration such that when the pedal cranks and the pedals are at a bottom dead center position, a transmission between the saddle and the saddle crank is at an angle to the saddle crank such that the weight of the cyclist is applied to the saddle crank to impart a torque to propel the cycle in a forward direction.

* * * * *